United States Patent
Siddiqui et al.

(10) Patent No.: US 12,385,747 B2
(45) Date of Patent: Aug. 12, 2025

(54) PATH GEOMETRY BASED ON VEHICLE SENSING

(71) Applicant: FORD GLOBAL TECHNOLOGIES, LLC, Dearborn, MI (US)

(72) Inventors: Adil Nizam Siddiqui, Farmington Hills, MI (US); Deepa Ramaswamy, Canton, MI (US); Cynthia M. Neubecker, Westland, MI (US); Robert Parenti, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 211 days.

(21) Appl. No.: 17/825,255

(22) Filed: May 26, 2022

(65) Prior Publication Data

US 2023/0384103 A1 Nov. 30, 2023

(51) Int. Cl.
*G01C 21/34* (2006.01)
*B60W 50/14* (2020.01)

(52) U.S. Cl.
CPC ......... *G01C 21/3461* (2013.01); *B60W 50/14* (2013.01); *G01C 21/3484* (2013.01); *G01C 21/3492* (2013.01); *B60W 2050/146* (2013.01); *B60W 2420/408* (2024.01)

(58) Field of Classification Search
CPC ............ G01C 21/3561; G01C 21/3484; G01C 21/3492; B60W 50/14; B60W 2420/408; B60W 2050/146
See application file for complete search history.

(56) References Cited

U.S. PATENT DOCUMENTS

| | | | |
|---|---|---|---|
| 10,620,638 | B2 | 4/2020 | Budihal et al. |
| 2018/0106632 | A1* | 4/2018 | Akhtar ............... G01C 21/3461 |
| 2018/0307915 | A1* | 10/2018 | Olson .................. G05D 1/0251 |
| 2019/0041514 | A1* | 2/2019 | Garcia Solache ...... G01S 15/42 |
| 2019/0385382 | A1 | 12/2019 | Davidson |
| 2020/0064843 | A1 | 2/2020 | Shashua et al. |
| 2021/0061273 | A1 | 3/2021 | Moskowitz et al. |

* cited by examiner

*Primary Examiner* — Aaron L Troost
(74) *Attorney, Agent, or Firm* — Joseph Zane; Brooks Kushman P.C.

(57) ABSTRACT

A system receives vehicle sensor data indicating upcoming route characteristics as a vehicle travels a route. The system identifies one or more passibility-limiting features from the vehicle sensor data and, based on the sensor data, interpolates at least one characteristics of at least one feature that would affect vehicle travel. The system determines if the feature has been previously identified by comparison to previously identified features associated with locations within a proximity of a present location of the vehicle. Further, the system determines if the at least one characteristic has more than a predefined deviance from one or more previously interpolated characteristics associated with the feature and alert the user via the vehicle if at least one of the previously interpolated characteristics or the at least one characteristic indicates that the vehicle may have difficulty passing the feature based on predefined parameters of the vehicle.

10 Claims, 5 Drawing Sheets

PATH GEOMETRY BASED ON VEHICLE SENSING

TECHNICAL FIELD

The illustrative embodiments generally relate to methods and apparatuses for mapping path geometry based on vehicle sensing.

BACKGROUND

Off-road travel has been a fun pastime for drivers who own vehicles suited for traveling over uneven and unpaved terrain. Whether on a fixed course or driving through land where such travel is permitted, these drivers enjoy the experience of traveling bumpy, muddy, uneven terrain, as their vehicles are typically suited and tuned (or tunable) for such travel.

While enjoyable for these drivers, a major issue with such travel can arise when permanent obstacles (or semi-permanent obstacles) physically prevent travel in a manner that the vehicle cannot overcome. For example, two trees or large stones (permanent obstacles) may exist in a configuration that makes a certain vehicle body simply unable to pass, either literally or at least without damaging the vehicle exterior. Paved roads include such features far less frequently, and usually with a paved road the location and existence of such a feature (e.g., a bridge height) is commonly known and does not change with time. On an off-road course, deep water (a semi-permanent obstacle) can expand, contract and change locations, trees may grow larger, rocks may fall alongside or on the path, etc. A driver may not even be able to turn around in certain situations, which may require significant back-tracking in reverse if an impassible object is encountered.

Satellite imagery may provide a basic sense of the trail width, but does a poor job of delineating height-based obstacles (e.g., a tree branch) and suffers from not being able to see through obstructions (leaf-cover, cliff overhangs, etc.). Accordingly, a path may be wider, narrower, or have less clearance than it appears to have on a satellite image. Vehicles vary widely in sizes and performance characteristics, and determining the possibility of a path, for a single type of vehicle, let alone a wide variety, may be a very difficult task. These trails, if there is even a literal trail, are often not traveled frequently enough to make it worth the effort to record a formal map as a matter of public record, and so only the drivers who travel these routes tend to know the exact nuance of a given path.

SUMMARY

In a first illustrative embodiment, a system includes one or more processors configured to receive vehicle sensor data indicating upcoming route characteristics as a vehicle travels a route. The one or more processors are further configured to identify one or more passibility-limiting features from the vehicle sensor data and, based on the sensor data, interpolate at least one characteristics of at least one feature that would affect vehicle travel. The processors are also configured to, based on the feature and the at least one characteristic, determine if the feature has been previously identified by comparison to previously identified features associated with locations within a proximity of a present location of the vehicle. Further, the processors are configured to determine if the at least one characteristic has more than a predefined deviance from one or more previously interpolated characteristics associated with the feature and alert the user via the vehicle if at least one of the previously interpolated characteristics or the at least one characteristic indicates that the vehicle may have difficulty passing the feature based on predefined parameters of the vehicle.

In a second illustrative embodiment, a method includes receiving a request from a user identifying a destination and current location, the request for travel along terrain comprising unmarked roads or trails leading to the destination and determining previously mapped segments of the terrain between the current location and the destination. The method also includes determining based on known passibility characteristics of the segments and parameters associated with a vehicle driven by the user, whether at least one projectedly possible path exists from the location to the destination. Further, the method includes identifying a sequence of segments constituting at least one possible path or partially possible path, depending on the results of the determining whether the projectedly possible path exists and presenting the sequence to the user in the vehicle.

In a third illustrative embodiment, a method includes receiving vehicle sensor data indicating upcoming route characteristics as a vehicle travels a route and identifying one or more passibility-limiting features from the vehicle sensor data. The method also includes, based on the sensor data, interpolating at least one characteristics of at least one feature that would affect vehicle travel and based on the feature and the at least one characteristic, determining if the feature has been previously identified by comparison to previously identified features associated with locations within a proximity of a present location of the vehicle. Also, the method includes determining if the at least one characteristic has more than a predefined deviance from one or more previously interpolated characteristics associated with the feature and alerting the user via the vehicle if at least one of the previously interpolated characteristics or the at least one characteristic indicates that the vehicle may have difficulty passing the feature based on predefined parameters of the vehicle.

DETAILED DESCRIPTION

Figure 1:
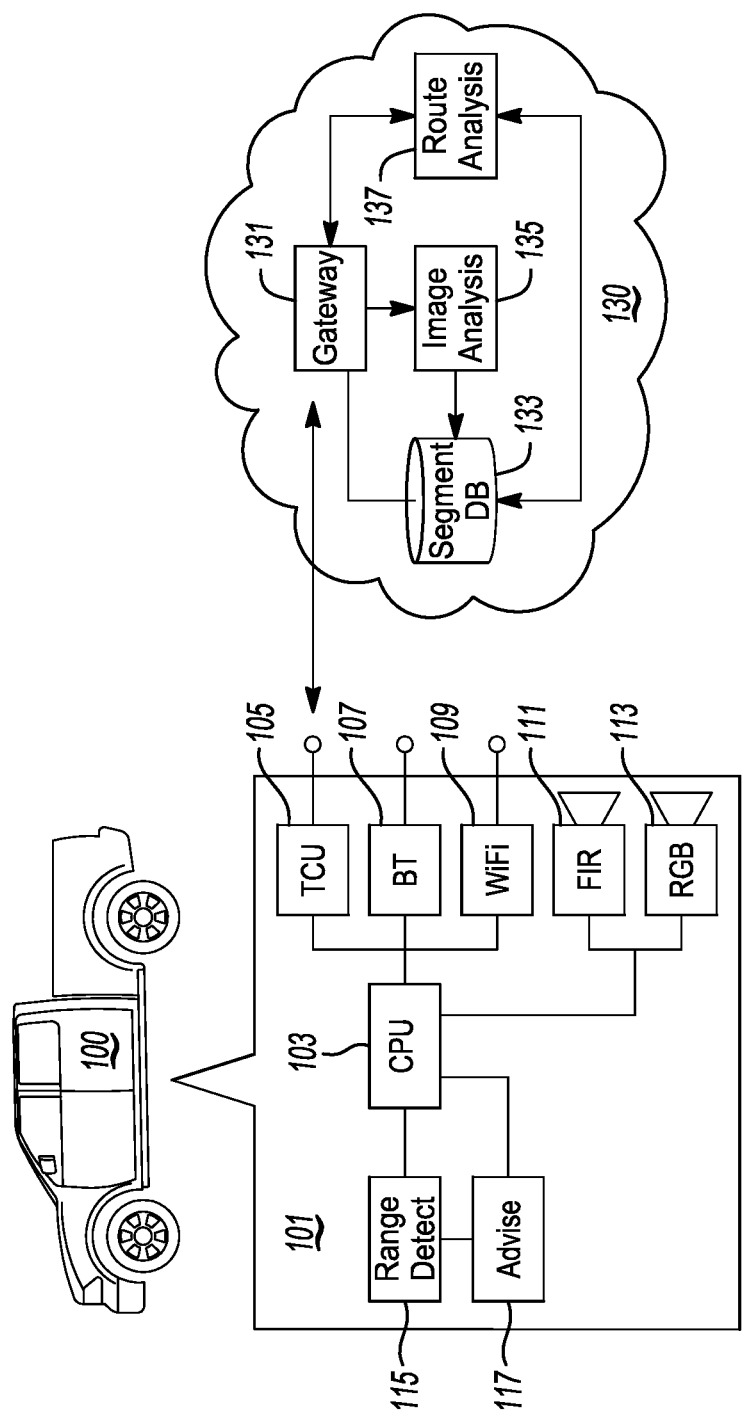
FIG. 1 shows an illustrative example of a vehicle with sensing capability and a trail mapping system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Drivers and vehicles traveling along trails are one of the best sources of information about the general characteristics of the trail and spot-characteristics. General characteristics may include, for example, widths of semi-paved portions, locations of fixed or permanent obstacles, etc. Spot-characteristics may include water-overflow, deadfall and other semi-permanent characteristics.

Using advanced vehicle sensing technology, it is possible to determine spacing between objects, object locations relative to a trail, and even the depth of water. This information can be reported to a global database where it can be used to more accurately geometrically map the trail in terms of characteristics. Information from this database, provided by prior drivers of the trail, may be used as a baseline and may be improved or modified based on presently observed characteristics.

With regards to obstacles such as water, whether they are permanent (a river bank or lake bank) or semi-permanent (overflow) may not be immediately apparent, but with multiple mappings it may be possible to determine which portions of water are seemingly always there, and which portions fluctuate with weather and seasons.

Drivers entering a trail or off-road environment can be advised of passable paths based on prior knowledge, semi-passable paths, or impassible paths or areas. This analysis can be based on features of the vehicle, both performance features and body characteristics (ground-clearance, width, height, etc.). Owners or those responsible for trails can be advised of spot-issues like deadfall, that may be cleared. By comparing a vehicle and its operating characteristics to a better set of trail parameters, vehicle operators can better work around situations where they may become stuck or damage to the vehicle may occur.

Traction analysis, speed, analysis, suspension analysis, etc. can help provide insight into the composition of a trail. Navigation systems may be adapted to show trails, either all trails or simply passable trails. The trails could be color coded for difficulty and possibility, and users could also set the navigation unit to only show trails of certain characteristics (e.g., passible without likely incident and level "easy" difficulty, as adjudged by characteristics like slopes, levelness, composition, mire, etc.). Temporal characteristics can be affixed to obstacles, which may be useful in analyzing the permanence of an impediment to travel. If an obstacle reveals itself to be amorphous in nature, it may be delineated differently on a trail map, to advise a user that the obstacle may or may not be there, and a timestamp of the last recorded parameters may be shown as well, so the user knows when the obstacle was last observed.

A general overview of a trail (the path) can be shown and color coded, and a more accurate segment analysis and view can be shown for a current segment (e.g., without limitation, the next 500 feet). Thus, the driver knows the general possibility of the trail, as well as more specific limitations about the area upcoming. The color coding of the trail could also change as the driver travels, to signify the relative difficulty or possibility of the remaining portion of the trail—i.e., if the driver was past the only challenging part, which had resulted in the trail being generally classified as "difficult," the remaining trail could change to a color representative of an easy trail, if only easy and easily passible terrain remained.

FIG. 1 shows an illustrative example of a vehicle with sensing capability and a trail mapping system. In this example, the vehicle 100 is a truck with an onboard computing system 101. The computing system includes one or more CPUs 103, as well as a telematics control unit (TCU) 105, a BLUETOOTH transceiver 107, a Wi-Fi transceiver 109, and other appropriate communication connections. The long-range cellular TCU can be used to communicate with the cloud, when cellular service is available, and can be used to transmit data about the trail to the cloud and receive data about the trail from the cloud.

Local connections may be more useful if multiple vehicles are traveling in proximity, and one leading vehicle can relay trail characteristics back to following vehicles. This could be additionally useful if the lead vehicle was effectively mapping the trail as it went, so that the following vehicles 100 would know where to travel, as well as trail characteristics. More permanent trails may have localized Wi-Fi transceivers (such as DSRC transceivers) provided thereto, to aid in information sharing and to assist in information relay when cellular service is unavailable.

The vehicle may also include an infrared camera 111, an RGB camera 113 and a variety of other sensors (e.g., without limitation, LIDAR, RADAR, SONAR, etc.). These sensors can gather information for analysis in real-time, which can occur onboard the vehicle 100 and/or in the cloud 130. The vehicle may have limited analysis capability that, for example, contemplates approximate heights, widths, etc., and the cloud may have more robust analysis capability that is better suited for doing comparative analysis across a wide set of data representing the trail. With sufficient computing and data access, this could also be done onboard the vehicle 100, but there may not always be an active cellular connection for accessing historical trail data, and the vehicle computing may be involved in other tasks, so the advanced processing is often more suited for the cloud environment, but does not necessarily have to be done there. A marked trail with DSRC transceivers may also include an edge node that has computing and storage, and which can, for example, keep a localized record of all the historical information about a given trail or set of trails, so that, for example, a vehicle may have access to the necessary local information, even if it cannot access the cloud dataset. This may be an installation that would be found, for example, in an off-road section of a national park or other maintained trail set or area designated for trail-travel.

On the other hand, a driver may (presumably with permission) simply elect to go driving through a random section of forest that has never been traveled. Limited satellite imagery may be available, and the vehicle 100 could actively gather data about the obstacles observed and encountered. The "trail" may be a series of GPS breadcrumbs as the vehicle 100 travels, but this could establish a path for other drivers and a baseline data set associated with the trail. Data can be uploaded in real-time and/or when a connection is re-established (if lost), and in such an instances onboard processing capability to do live analysis of the data may be a useful aspect, both at least because there may be no comparative data and because there may be no active or available remote connection to the cloud in any event.

The vehicle computing system may also include range detection 115 and other analysis processes, that help determine distances to certain objects (which can be used to determine the boundaries of objects) as well as advisory processes 117 that provide the driver with recommended actions based on the analysis and that may further automatically engage certain systems to help mitigate any issues a driver might encounter based on projected obstacles (e.g., without limitation, braking, mirror retraction, suspension and traction changes, etc.).

The cloud 130 may include a gateway process for handling communication (incoming and outgoing). There may be a trail segment database 133, which can include both whole-trail datasets and trail segment data sets. It may be useful to segment the trail, especially where multiple branching options occur, so that a system can dynamically assemble one or more passible versions of a trail for a given vehicle and/or dynamically assemble one or more versions of a trail that meet passibility or difficulty preferences of a given driver. The segment and/or trail data 133 can include satellite imagery, trail imagery, sensor data, marked objects, permanence characteristics of objects, etc., as well as characteristics of vehicles that successfully navigated the trail (vehicle features, vehicle dimensions, number of times, context for travel, etc.).

Image analysis process 135 and comparable processes can analyze image and sensor data to more clearly map the geometry and geography of a trail, and may also benefit from machine learning aspects to more clearly identify both objects on trails and the composition or nature of those objects. This and other processes can also be used to update the data sets in the segment/trail database 133, which can include adding or changing characteristics of a trail, based on, for example, how confident the analysis is that a certain characteristic results or exists. A route analysis process 137 can provide drivers with advice about local trails along a route, and may analyze the trails against known characteristics of a given vehicle and/or driver preferences, to determine the suitability of a given trail for a given vehicle or driver.

Figure 2:
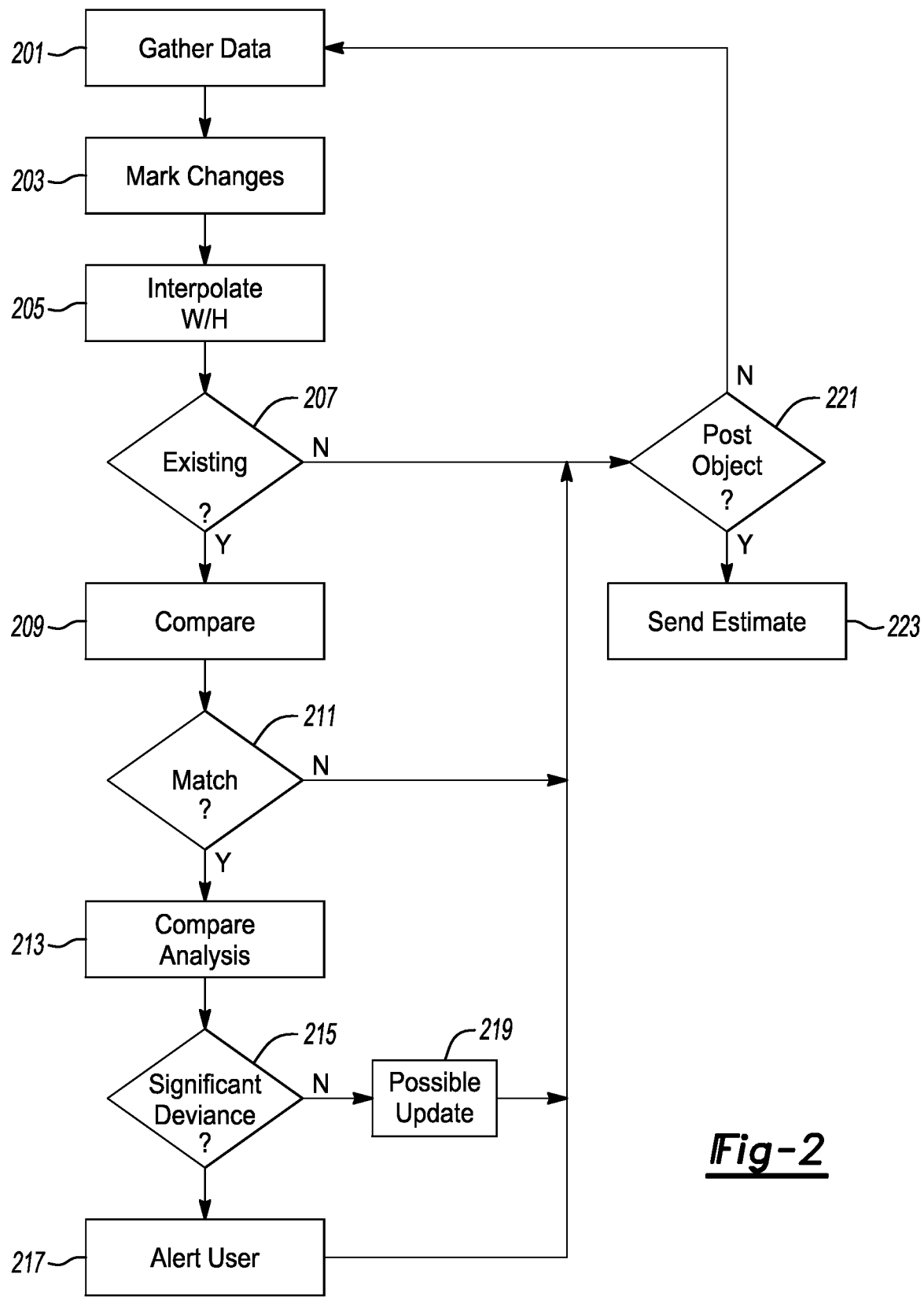
FIG. 2 shows an illustrative example of a process for using vehicle sensor data to geometrically map a trail.

FIG. 2 shows an illustrative example of a process for using vehicle sensor data to geometrically map a trail. In this example, as a vehicle 100 travels down a trail or path (or just generally forward), the vehicle 100 gathers data at 201. This can include, for example, imagery data, sensor data, etc. For example, radar data can detect object distances, visual data can reveal the height and width of protrusions through image analysis, this can include trail width, space between objects, overhang height, etc.

As the vehicle travels forward, the data is continually gathered for each detected object and the trail, and changes in the relative distance, relative size, etc. are determined from dataset to dataset at 203, allowing for interpolation of the locations of the objects based on travel characteristics of the vehicle (how much the vehicle moved along each axis between data sets) and change characteristics of the objects. Since objects like tree branches may be moving with wind, observation over multiple sets may give information like maximum deflection (minimum height), and other objects like tree trunks and rocks may have fixed location information that can be determined based on the preceding determination or another similar determination at 205. This determination at 205 can also include determining the height of any protrusions and/or width of any spaces across the trail or between two objects whose location has been relatively determined.

If sensors can continue to sense an object as the vehicle 100 passes the object, this information and imagery data may be useful in determining the shape and size of the object, since a rock wall that is 12 feet long and a tree that is two feet wide may not reveal their difference from a sensor characteristic until the vehicle passes a leading point (and can see along a dimension of the object). Once the vehicle 100 is past the object and any sensor data is no longer being gathered at 221, the process may send an estimate of the characteristic determinations for that object to the cloud 130 at 223. This information can be combined with past observations about the object to form a more comprehensive picture of the geographic and geometric state of the trail.

If the vehicle already has information about the object (e.g., from a previous trip with data indicating the presence of the object) at 207, the process may compare the current information with prior information at 209. If the two objects appear to match in characteristics (likely with a certain confidence, since 100% matching may not always be possible) at 211, the process may compare a present analysis (characteristics, location, etc.) with prior analysis at 213. If the current numbers (location, height, composition, etc.) do not represent a significant deviance at 215, the process may flag the object for a possible update at 219 and continue to gather data about the object, eventually transmitting the information to the cloud. If there is a significant deviance, the process may alert the user at 217.

For example, a rock may appear to have substantially the similar shape and location as a prior rock, in one instance, so while additional mapping may better define the rock, the passibiltiy of the trail may remain unaffected. In another example, additional rocks may have fallen, and the rock may seem to only share about 40 or 50% of the characteristics expected of a rock at that location (the deviance threshold can be user or OEM tunable) and this may trigger a user alert to at least slow down, as the possibility determination was based on the prior condition of the trail (i.e., the rock as it previously was). Similarly a tree may grow slightly or move in the wind (similar conditions) or a large portion of the tree may break and fall in a storm (significant deviance) and the user may find a route impassible because of a characteristic change. If the vehicle 100 detects any objects either not previously encountered or unexpectedly different from data used for a passibiltiy calculation, it may alert the user to slow down, so that the user does not move forward assuming that the way may be tight, but it generally passible, since that determination may be affected by the changed characteristics or new object.

Figure 3:
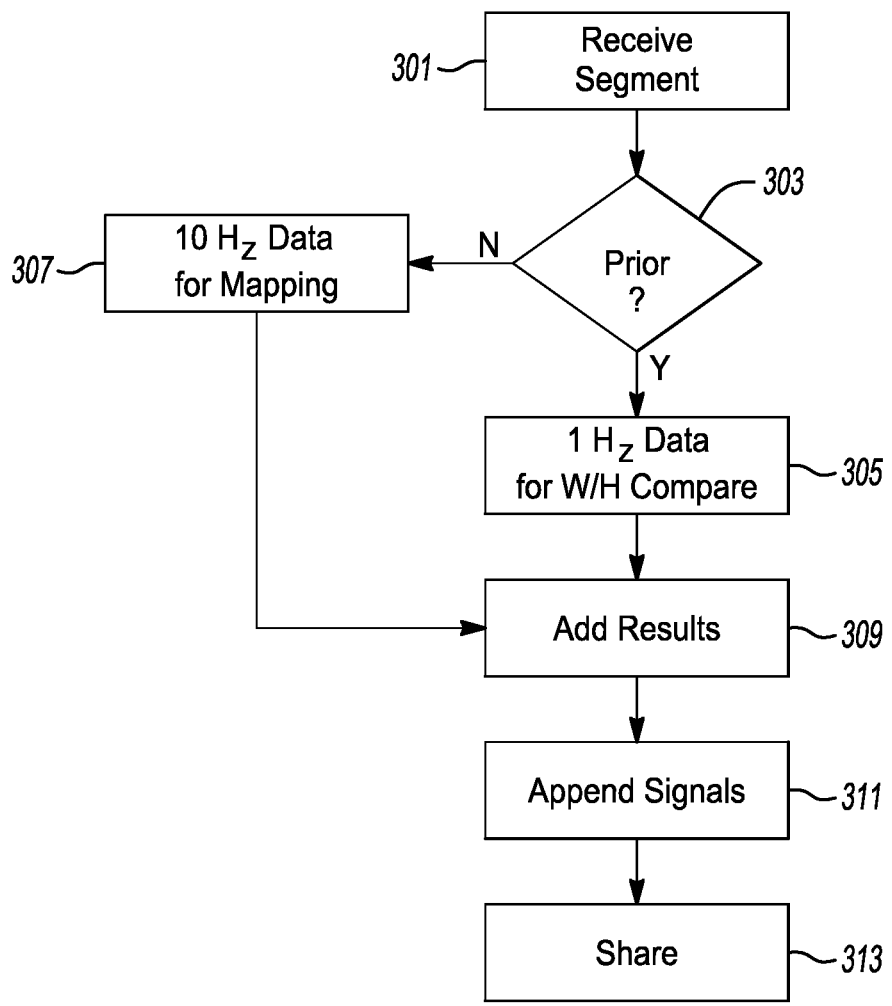
FIG. 3 shows an illustrative example of a path-update process.

FIG. 3 shows an illustrative example of a path-update process. In this example, the process receives known prior segments of trail data proximate to a vehicle 100 location at 301. This may include, for example, all known segments of trail within a planned traveling distance, so that if a signal is later lost, local trail segments are at least onboard the vehicle. If the current or upcoming segment is a prior segment at 303, previously observed, then the vehicle 100 may use 1 Hz radar and camera data for comparison against a width profile at 305. 1 Hz radar is an example of a scan that may be less detailed than another option, such as 10 Hz, but the two particular frequencies are used for illustrative purposes only in a relativistic sense.

On the other hand, if the upcoming segment is new (or includes likely new sections, for a random path through the woods, for example), the process may use 10 Hz camera and radar data for mapping the section for initial recordation at 307. This or other higher resolution scanning may be useful on newer trail segments where less complete data exists. Even if the segment has been previously observed, higher frequency, higher detail mapping may be used for some number of intervals or until certain resolutions of information have been obtained and confirmed Additionally or alternatively, a lower resolution scan resulting in significant deviance may result in a request for a higher resolution scan from the vehicle, or from a next-vehicle if the vehicle reporting the deviance is already past a point of interest.

The results are added to the data store at 309, which can include immediate or later upload if connections are not readily available. The results for new mappings are added as new data, and the results for relative comparison may be added as modifications to existing data. When an object appears to have, for example, multiple different locations proximate to a trail, systems may elect to use the seemingly closest location for the object until later confirmation data can more precisely fix the location relative to the trail. This may over-define the object perimeter, but may be a better approach from a driver perspective than, for example, using an average of the observed locations, which is also a possible solution.

For each dataset observed through the sensors, the vehicle 100 may append telemetry data, chassis signal logs, etc. at 311, so that vehicle data carries forward with the object data, which may be useful in later analysis. This data can then be shared with the cloud at 313.

Figure 4:
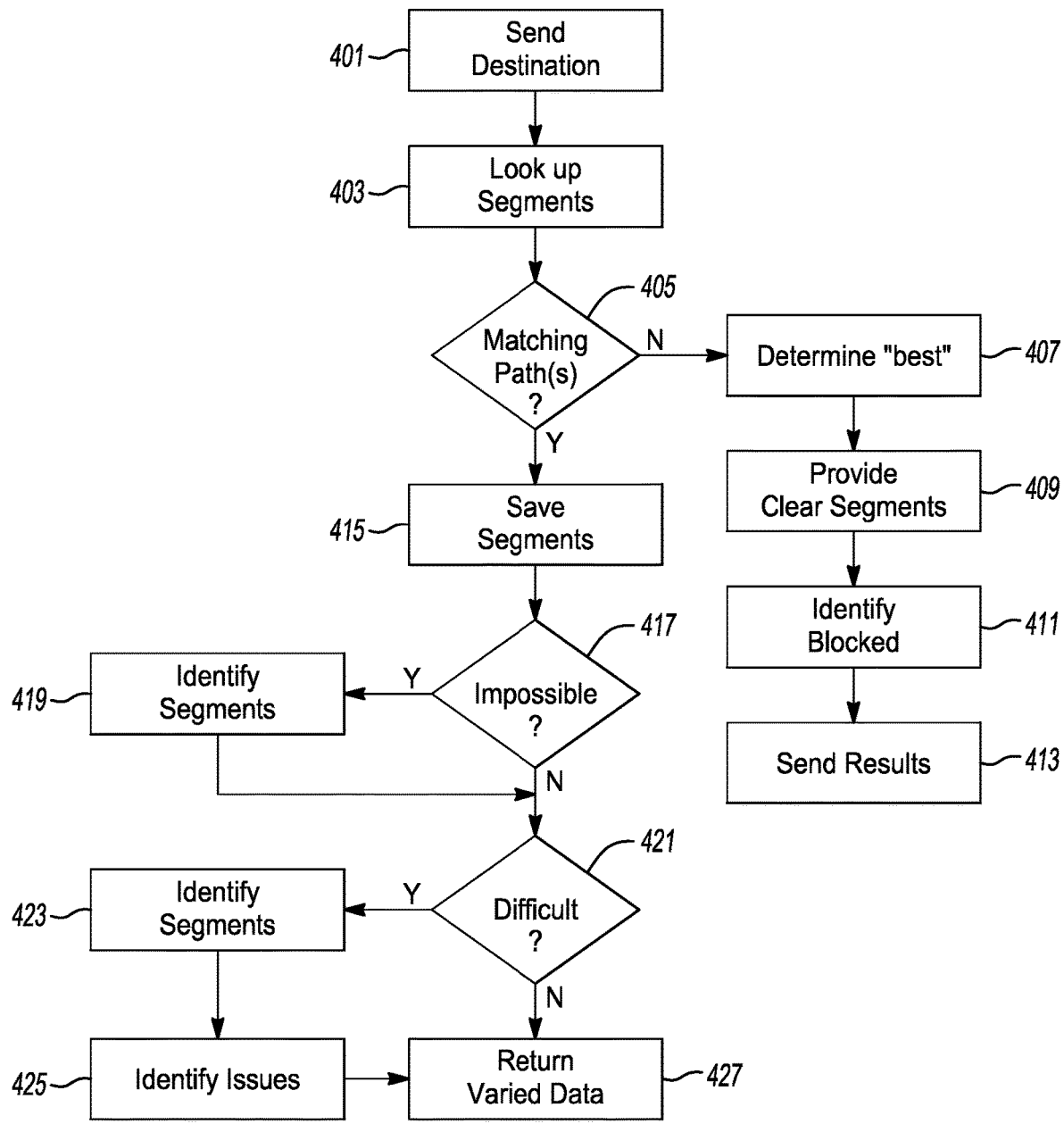
FIG. 4 shows an illustrative trail-analysis process.

FIG. 4 shows an illustrative trail-analysis process. In this example, the process sends a present location or start location and a destination (e.g., trail end) at 401. There may be a single defined trail between the two locations, or there may be more of a sandbox, where a user can go many directions. In the latter case, groups of GPS coordinates or known trail portions may form segments. Segments may also be delineated by areas where branching occurs and a choice can be made, or by areas that have markedly different travel characteristics—e.g., on a five mile trail, the first two miles may lead to a narrow ravine of 500 feet, and those may be two different segments even if the trail only has a singular route.

The server may look up various segments of the trail at 403, as noted above. There may only be a single segment, or a single route may be divided into segments. Here, the analysis is a possibility analysis, at least, and so the characteristics of a segment may include the least-passible natures of the segment. For example, if one portion of the segment has large holes, and another is very narrow, the correct clearances and vehicle widths necessary for passing the segment may be defined in relationship to the segment, which can be, among other things, defined in terms of the actual characteristic (e.g., holes of 8 inches and 12 inches wide/width of 5 feet/clearance of 7 feet) or in terms of vehicle characteristics (e.g., minimum ground clearance, maximum width and height).

If there is not a path from start to finish for which all characteristics are known at 405, so which is ultimately projected to be impassible, the process may determine a "best" path at 407 and at least which segments are clear at 409. These could be shown to the user as a path in green for the best and clear alternative branches as yellow, for example. The process may also identify blocked, impassible or unknown segments at 411, which could be shown to the user as red branches. These may not be fully blocked, but may be deemed to be impassible for various reasons and so represent options that should not likely be taken by the user. The process can then send the results at 413 for presentation to a user, for example. The user may still want results representing the most projected travelable space, even if the ultimate conclusion is that the user cannot likely clear the route.

If there is a complete path found, the process saves the identified segments at 415 that represent possible complete paths, which can also include difficult segments that can be presented to a user as challenging, but likely possible with sufficient skill. Certain segments may be impassible at 417, such as those through which a vehicle simply will not fit (e.g., a 4 foot wide clearance) and those can be save for identification for the user, along with the characteristics that render them projected impassible, at 419.

Other segments may be deemed difficult at 421, such as those that are barely physically passible or those requiring advanced driving skills or careful maneuvering to work around obstacles. Those can be saved at 423, along with a list at 425 of potential issues, recommended skills, etc. If the segment is a longer segment, specific coordinates of projected difficult travel can also be identified, and/or the segment could be color coded in multiple colors to identify for a user when they are approaching a difficult point. The data on possible routes and segment characteristics can then be returned at 427.

Figure 5:
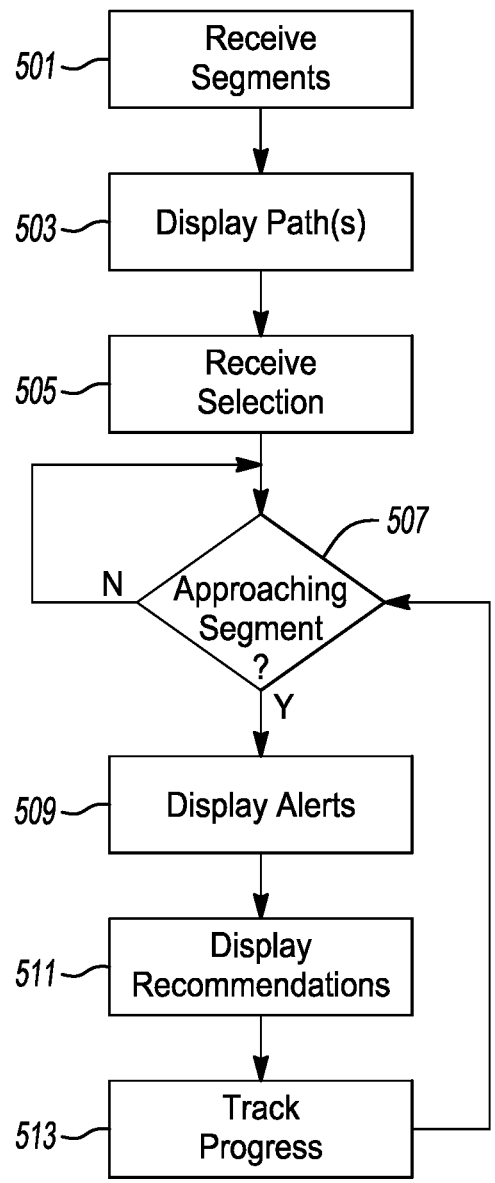
FIG. 5 shows an illustrative progress-tracking process.

FIG. 5 shows an illustrative progress-tracking process. This allows presentation of a possible route for users, along with segment-specific information that can also be improved as above as the user travels a segment or trail.

The vehicle receives the segments and/or full route(s) at 501 and displays possible paths at 503. This can include a recommended path or path, challenging paths, and impassible paths, which may be delineated by color or other scheme. A user can select a preferred path at 505, which can be selection of whole path or individual segment selection.

As the vehicle travels, the process determines if a new segment is being approached at 507. Data for a current and/or next segment, for example, may be displayed to the user. Any alerts associated with the segment may be displayed at 509. This can include, for example, passibility alerts, driving skill alerts, high maneuvering alerts, etc. Any recommendations may also be displayed at 511, which can include, for example, speed limiting, retraction of windows or upper lighting mounts, use of or non-use of mode settings, etc. The vehicle tracks the progress of the user along the segments and can provide more detailed information as needed when a particular point of a segment is reached or approached.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A system comprising:
   one or more processors configured to:
   receive vehicle sensor data, at a first resolution, indicating upcoming route characteristics as a vehicle travels an off-road route;
   identify one or more passibility-limiting features of the off-road route from the vehicle sensor data received at the first resolution, the one or more passibility-limiting features indicative of a travel-impediment that affects the passibiltiy of at least a portion of a path ahead along the off-road route;
   based on the sensor data, interpolate at least one feature characteristic of at least one feature of the one or more passibility-limiting features that would affect vehicle travel;
   based on the at least one feature and the at least one feature characteristic, determine whether the at least one feature has been previously identified by comparison to previously identified features associated with locations within a predefined proximity of a present location of the vehicle;
   responsive to determining that the at least one feature has been previously identified, determine whether the at least one feature characteristic has more than a predefined deviance from one or more previously interpolated feature characteristics stored in association with one of the previously identified features corresponding to the at least one feature; and
   responsive to the predefined deviance exceeding a predefined threshold, utilize one or more vehicle sensors defined as providing sensor data at a higher resolution than the first resolution to more granularly map at least the at least one feature characteristic.

2. The system of claim 1, wherein the data includes radar data.

3. The system of claim 1, wherein the at least one feature characteristic includes height.

4. The system of claim 1, wherein the at least one feature characteristic includes width.

5. The system of claim 1, wherein the at least one feature characteristic includes depth.

6. The system of claim 1, wherein the at least one feature characteristic includes location.

7. The system of claim 1, wherein the one or more processors are configured to alert the user via the vehicle if at least one of the previously interpolated feature characteristics or the at least one feature characteristic indicates that the vehicle may have difficulty passing the at least one feature based on predefined parameters of the vehicle.

8. The system of claim 7, wherein the parameters include ground clearance.

9. The system of claim 7, wherein the parameters include vehicle width or height.

10. A method comprising:
    receiving vehicle sensor data, at a first resolution, indicating upcoming route characteristics as a vehicle travels an off-road route;
    identifying one or more passibility-limiting features of the off-road route from the vehicle sensor data received at the first resolution, the one or more passibility-limiting features indicative of a travel-impediment that affects the passibiltiy of at least a portion of a path ahead along the off-road route;
    based on the sensor data, interpolating at least one feature characteristic of at least one feature of the one or more possibility-limiting features that would affect vehicle travel;
    based on the at least one feature and the at least one feature characteristic, determining whether the at least one feature has been previously identified by comparison to previously identified features associated with locations within a predefined proximity of a present location of the vehicle;
    responsive to determining that the at least one feature has been previously identified, determining whether the at least one feature characteristic has more than a predefined deviance from one or more previously interpolated feature characteristics stored in association with one of the previously identified features corresponding to the at least one feature; and
    responsive to the predefined deviance exceeding a predefined threshold, utilizing one or more vehicle sensors defined as providing sensor data at a higher resolution than the first resolution to more granularly map at least the at least one feature characteristic.

\* \* \* \* \*